(12) United States Patent
Lee

(10) Patent No.: US 7,281,441 B2
(45) Date of Patent: Oct. 16, 2007

(54) MEDIA THICKNESS DETECTOR

(75) Inventor: Byung-Mok Lee, Suwon (KR)

(73) Assignee: LG N-sys Inc., Seoul (KR)

( * ) Notice: Subject to any disclaimer, the term of this patent is extended or adjusted under 35 U.S.C. 154(b) by 256 days.

(21) Appl. No.: 10/901,029

(22) Filed: Jul. 29, 2004

(65) Prior Publication Data
US 2005/0056575 A1   Mar. 17, 2005

(30) Foreign Application Priority Data
Aug. 1, 2003   (KR) .................. 10-2003-0053541

(51) Int. Cl.
G01M 19/00   (2006.01)
B65H 7/12   (2006.01)
(52) U.S. Cl. .................. 73/865.8; 271/262
(58) Field of Classification Search .............. 271/262, 271/263; 73/865.8
See application file for complete search history.

(56) References Cited
U.S. PATENT DOCUMENTS

| | | | | |
|---|---|---|---|---|
| 4,378,109 A * | 3/1983 | Takahashi et al. | .......... | 271/263 |
| 4,550,252 A * | 10/1985 | Tee | .......... | 250/223 R |
| 5,174,562 A | 12/1992 | Mizunaga et al. | | |
| 5,203,555 A * | 4/1993 | Cannaverde et al. | ........ | 271/263 |
| 5,557,427 A * | 9/1996 | Kamiya | .......... | 358/496 |
| 5,678,678 A * | 10/1997 | Brandt et al. | .......... | 194/206 |
| 5,727,692 A * | 3/1998 | Large et al. | .......... | 209/603 |
| 5,806,992 A * | 9/1998 | Ju | .......... | 400/56 |
| 5,966,559 A * | 10/1999 | May et al. | .......... | 399/45 |
| 5,982,400 A * | 11/1999 | Yokoi et al. | .......... | 346/134 |
| 6,672,587 B1 * | 1/2004 | Mohringer et al. | .......... | 271/259 |
| 6,734,417 B2 * | 5/2004 | Vejtasa | .......... | 250/231.13 |
| 7,120,370 B2 * | 10/2006 | Watabe | .......... | 399/67 |

* cited by examiner

Primary Examiner—Hezron Williams
Assistant Examiner—John Fitzgerald
(74) Attorney, Agent, or Firm—Birch, Stewart, Kolasch & Birch, LLP

(57) ABSTRACT

A media thickness detector includes a driving force transmission part for removing vibration generated from a driving source. A sensing roller feeds media by receiving the driving force through the driving force transmission part. Sensing bearings are installed on bearing holders and rotate about a central shaft under an elastic force so that they are brought into close contact with the sensing roller. A damper member is connected to the central shaft at a position between the bearing holders and absorbs vibration generated in the central shaft. A thickness sensor detects the thickness of media passing between the sensing bearings and the sensing roller based on a rotating amount of the bearing holders.

22 Claims, 5 Drawing Sheets

MEDIA THICKNESS DETECTOR

The present application claims, under 35 U.S.C. § 119, the priority benefit of Korean Patent Application No. P2003-053541 filed Aug. 1, 2003 in the Republic of Korea, the entire contents of which are herein fully incorporated by reference.

BACKGROUND OF THE INVENTION

1. Field of the Invention

The present invention relates to a media thickness detector, and more particularly, to a media thickness detector capable of detecting the thickness of media to be fed.

2. Description of the Related Art

A media thickness detector detects the thickness of media, such as bank notes, checks, tickets, certificates and paper. The reason for detecting the thickness of media is to ensure smooth operations of an apparatus by preventing a plurality of sheets of media from being fed together or by preventing inferior media from being fed. For example, such a media thickness detector is used in automatic teller machines, ticket-issuing machines, certificate-issuing machines, printers, facsimile machines, and the like.

Methods of detecting the thickness of media include a method of detecting the thickness of media in which a roller comes into direct contact with media by means of a mechanical mechanism, a method of detecting the thickness of media using an optical sensor without bringing a mechanical mechanism into direct contact with media, and a combination thereof FIGS. 1 and 2 show a media thickness detector in accordance with the related art. Referring to these figures, a sensing roller 12 is installed on a rotational shaft 10 of which both ends are supported on a frame (not shown). The sensing roller 12 is disposed on a path along which media m travel. The sensing roller 12 is rotated by a driving belt 14 that is driven by a driving source. The driving belt 14 connects the driving source and the rotational shaft 10 to transmit power from the driving source to the rotational shaft 10, thereby causing the sensing roller 12 to rotate. A timing belt is used for the driving belt 14.

A central shaft 16 of which both ends are supported on the flame is provided in the vicinity of the rotational shaft 10. A bearing holder 18 is installed on the central shaft 16. Return springs 19 are installed at both ends of the central shaft 16 provided with the bearing holder 18. An end of each of the return springs 19 is connected to the bearing holding 18 at a point spaced from the central shaft 16 and the other end of the return spring 19 is connected to the frame, whereby the return spring imparts a restoring force in a specific direction. Therefore, the bearing holder 18 tends to always rotate in a specific direction.

Sensing bearings 20 are provided at a side of the bearing holder 18. As seen from FIG. 2, the two sensing bearings 20 are provided at both ends of the one side of the bearing holder 18, respectively. The circumference of the sensing bearing 20 is set to be approximately a half of the traveling length of media m.

The sensing bearings 20 are installed on the bearing holder 18 such that they can be freely rotated. The sensing bearings 20 tend to always move in a direction in which they are brought into close contact with the sensing roller 12, because the bearing holder 18 is rotated toward the sensing roller 12 by means of the restoring force of the return springs 19. The media m to have its thickness detected is fed between the sensing roller 12 and the sensing bearings 20.

A thickness sensor 22 detects the thickness of media m by detecting a rotating amount of the bearing holder 18. An example of the thickness sensor 22 includes a RVDT (Rotational Variable Differential Transformer) sensor.

However, the aforementioned related art has the following problems.

First, since the sensing roller 12 is rotated by receiving a driving force from the driving source through the driving belt 14, vibration from the driving source is transmitted to the sensing roller 12 through the driving belt 14. When vibration is transmitted from the driving source to the sensing roller 12, there is a problem that the thickness of media m cannot be accurately measured, particularly when a mechanical mechanism is used for detecting the thickness.

Further, each of the sensing bearings 20 must come into contact with the media. However, the two sensing bearings 20 are installed on a single bearing holder 18. Therefore, the sensing bearings 20 cannot be brought into close contact with the sensing roller 12 with the same force when the bearing holder 18 is not accurately installed. In other words, if the bearing holder 18 is slightly tilted because of manufacturing tolerances, one sensing bearing 20 will bear against the media with a greater force than the other sensing media. Accordingly, there is also a problem in that the thickness of media m cannot be accurately detected.

In addition, since the circumference or perimeter length of the sensing bearing 20 is set to be about a half of the traveling length of media m, the sensing bearing 20 is rotated twice while a sheet of media m travels between the sensing bearing and the sensing roller. Therefore, there is another problem in that the thickness detection capability is deteriorated since measuring errors that may be produced due to the tolerance of the sensing bearing 20 are accumulated.

SUMMARY OF THE INVENTION

Accordingly, the present invention is conceived to solve the aforementioned problems in the prior art. An object of the present invention is to provide a media thickness detector wherein external vibration cannot be transmitted to components that come into direct contact with media.

Another object of the present invention is to provide a media thickness detector wherein a sensing bearing is accurately contacted with a sensing roller.

A further object of the present invention is to provide a media thickness detector wherein the rotation of a sensing bearing can be minimized while a sheet of media is fed past it.

According to an aspect of the present invention for achieving the objects, there is provided a media thickness detector, comprising a driving force transmission which removes vibration generated from a driving source and transmits a driving force of the driving source. A sensing roller feeds media by receiving the driving force of the driving source through the driving force transmission part. Sensing bearings are installed on bearing holders rotating about a central shaft, such that an elastic force is exerted thereon in a direction in which they are brought into close contact with the sensing roller. A damper member is connected to the central shaft at a position between the bearing holders for absorbing vibration generated in the central shaft. A thickness sensor detects a thickness of the media passing between the sensing bearings and the sensing roller based on a rotating amount of the bearing holders with respect to the central shaft.

The driving force transmission part may be a gear train driven by means of the driving source for providing the media feeding force.

Preferably, a first gear of the gear train receives the driving force from the driving source through a belt.

Preferably, both ends of the central shaft are supported on a frame on which connecting brackets in turn are installed between the bearing holders and the frame, respectively. Restoring members provide an elastic force bringing the sensing bearings into close contact with the sensing roller and are installed such that both ends thereof are connected to the connecting bracket and the frame, respectively.

The sensing bearings may be freely rotatably installed on the bearing holders at positions corresponding to both lateral ends of the media, respectively.

Preferably, an end of the damper member is connected to the central shaft at a position between the bearing holders.

The damper member may have a spring force relatively less than a spring force of the restoring members installed at the opposite ends of the central shaft for providing the sensing bearings with the elastic force.

The spring force of the damper member may be about two third of the spring force of one of the restoring members for providing the sensing bearings with the elastic force.

Preferably, the following equation is satisfied: $d=(0.2\sim0.25)w$, where d is a diameter of the sensing bearing and w is a traveling width of the media.

According to another aspect of the present invention, there is provided a media thickness detector, comprising a gear train which receives a driving force for feeding media from a driving source and transmits the received driving force. A sensing roller feeds media by receiving the driving force of the driving source through the gear train. Bearing holders are installed on a central shaft at positions corresponding to both lateral ends of the fed media and rotate about the central shaft. Sensing bearings are rotatably installed on the bearing holders such that an elastic force is exerted thereon in a direction in which they are brought into close contact with the sensing roller. A thickness sensor detects a thickness of the media passing between the sensing bearings and the sensing roller, based on a rotating amount of the bearing holders with respect to the central shaft.

The detector may further comprise a damper member connected to the central shaft at a position between the bearing holders for absorbing vibration generated in the central shaft.

According to the media thickness detector of the present invention configured as above, there are advantages in that vibration is minimized in the parts coming into contact with the media and the part tolerance is minimized, whereby the thickness of media can be detected more accurately.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Now, a preferred embodiment of a media thickness detector according to the present invention will be described in detail with reference to the accompanying drawings.

Figure 1:
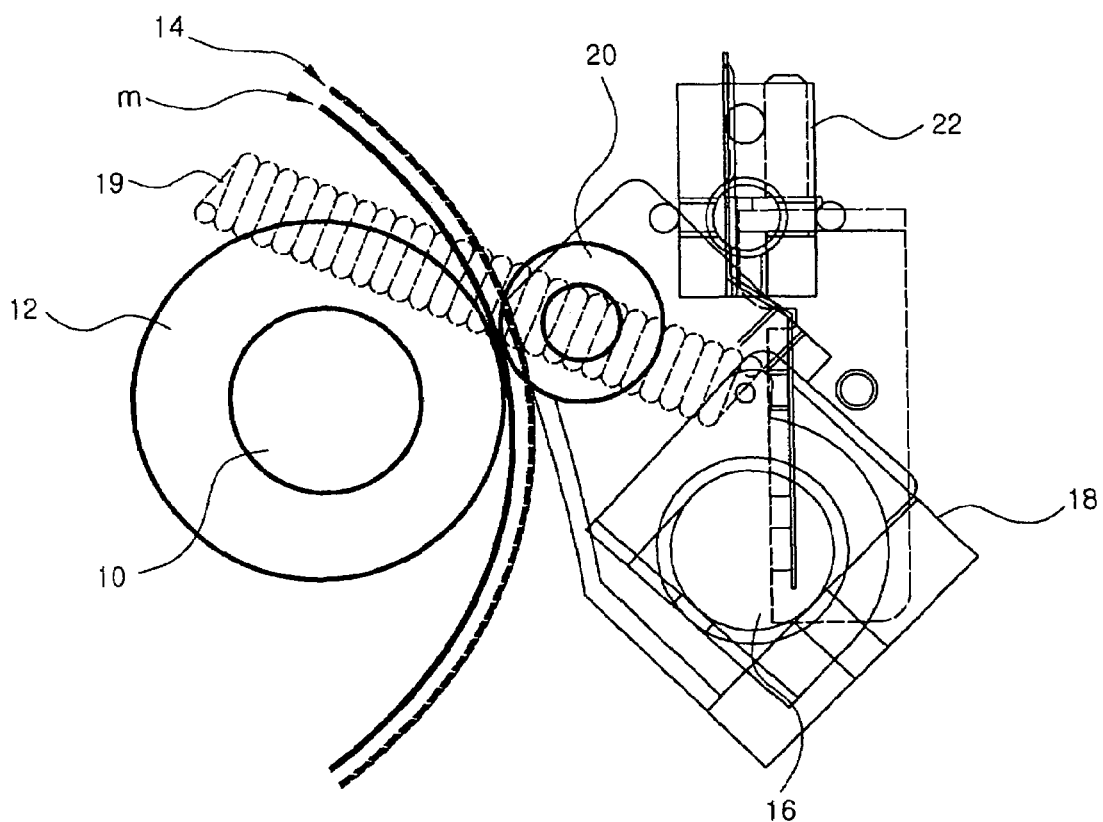
FIG. 1 is a side view showing the configuration of a related art media thickness detector.
Figure 2:
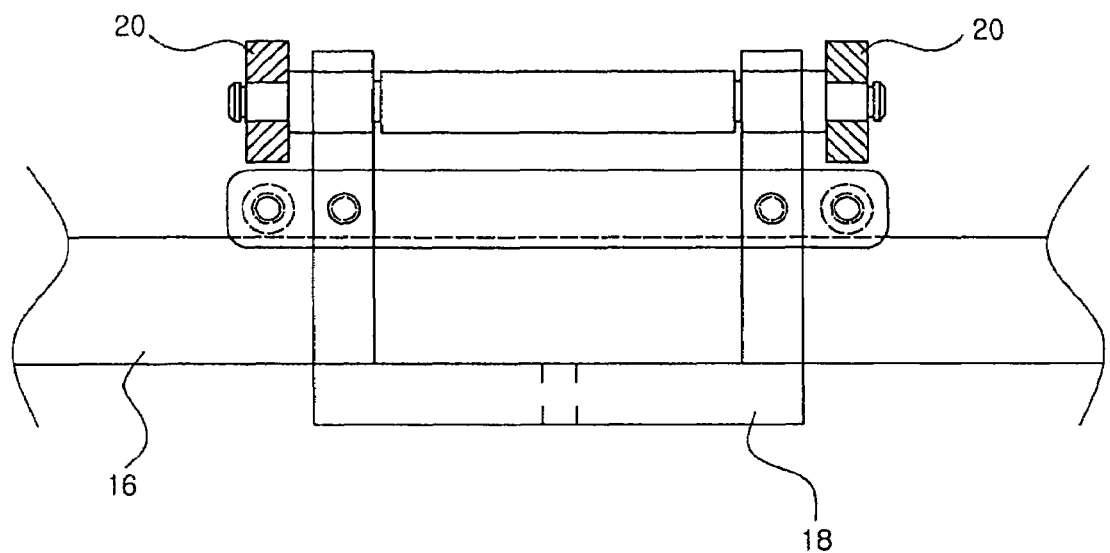
FIG. 2 is a plan view showing the configuration of a bearing holder and sensing bearings used in the related art media thickness detector.
Figure 3:
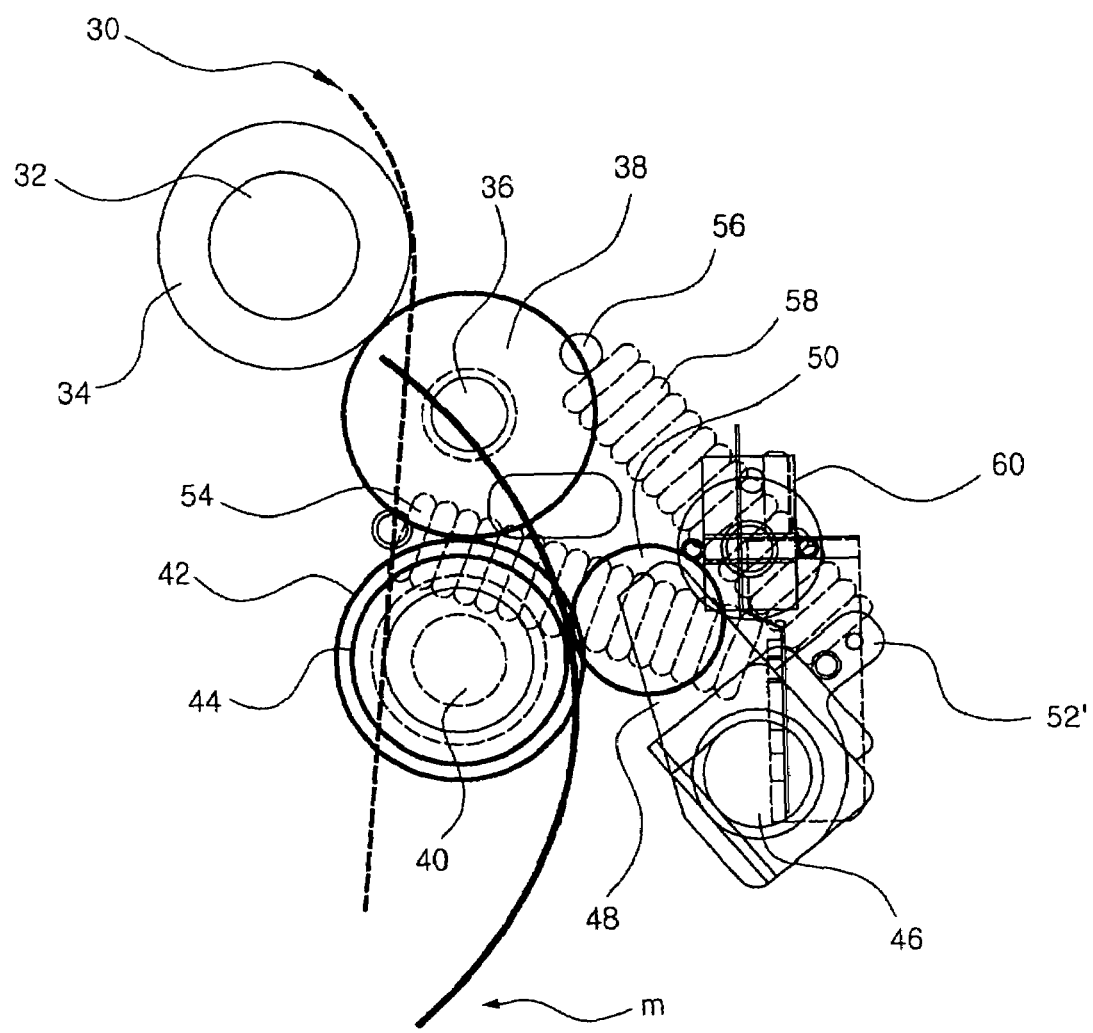
FIG. 3 is a side view showing the configuration of a media thickness detector according to a preferred embodiment of the present invention.
Figure 4:
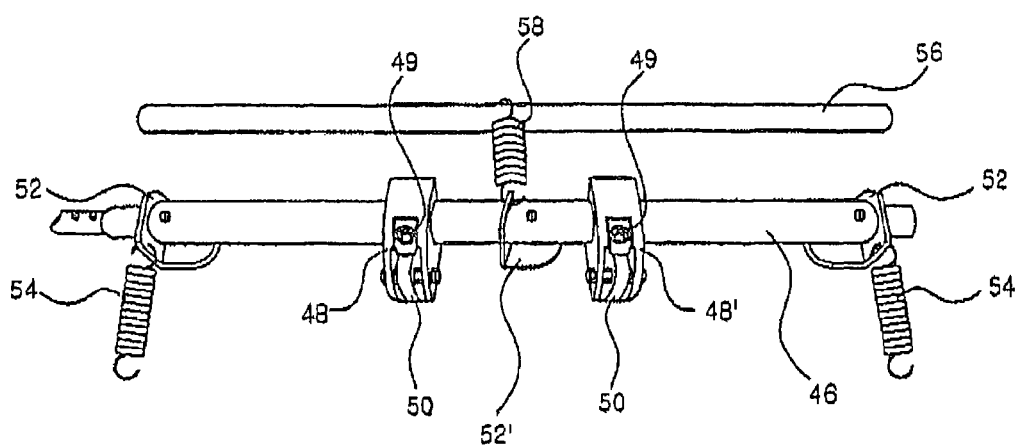
FIG. 4 is a perspective view showing the main configuration of the embodiment of the present invention.
Figure 5:
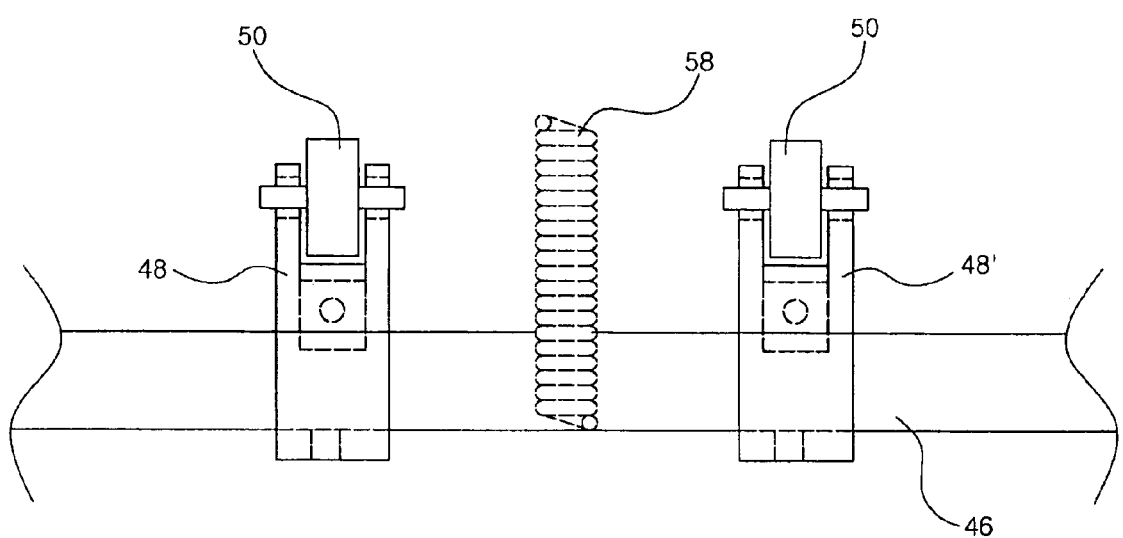
FIG. 5 is a plan view showing the main configuration of the embodiment of the present invention.

FIG. 3 is a side view showing the configuration of the media thickness detector according to the preferred embodiment of the present invention, FIG. 4 is a perspective view showing the main configuration of the embodiment of the present invention, and FIG. 5 is a plan view showing the main configuration of the embodiment of the present invention.

Referring to these figures, a driving belt 30 is driven by a driving source (not shown) which generates a driving force for feeding media m, thereby transmitting the driving force. Of course, the driving belt 30 may receive a driving force from an additional driving source separate from the driving source for feeding the media m.

A first gear 34 is installed on a first gear shaft 32. Both ends of the first gear shaft 32 are supported on a frame (not shown). In case of an automatic media dispenser, for example, the frame is a member composed of plates spaced apart from each other at a predetermined interval. Both ends of the first gear shaft 32 are installed on the frame. The first gear shaft 32 is driven by the driving belt 30. To this end, it is preferred that an additional belt pulley (not shown) be coaxially installed on the first gear shaft 32. A second gear 38 is installed on a second gear shaft 36, of which both ends in turn are also supported on the frame. The second gear 38 is engaged with the first gear 34 to receive the driving force from the first gear 34.

A rotational shaft 40 of which both ends are also supported on the frame is provided with a driven gear 42 at a side thereof. The driven gear 42 is engaged with the second gear 38 to receive the driving force from the second gear 38. A sensing roller 44 is coaxially installed on the rotational shaft 40. The sensing roller 44 is disposed on a feeding path along which media m travel. Therefore, a plurality of sensing rollers 40 may be provided according to the width of media m. The sensing roller 44 serves to feed the media m while rotating together with the rotational shaft 40.

Further, a central shaft 46 of which both ends are supported on the frame is provided. Bearing holders 48 and 48' are integrally formed on and rotated about the central shaft 46. The bearing holders 48 and 48' are installed to be spaced apart along a length of the central shaft 46. Sensing bearings 50 are installed on the bearing holders 48 and 48', respectively, such that they can be freely rotated about relevant shafts.

Since the sensing bearings 50 are placed at positions corresponding to the sensing roller 44, the sensing bearings 50 should be brought into surface contact with the sensing roller 44 when the media m are not fed between them. The spacing between the sensing bearings 50 should be less than the width of media m along a direction perpendicular to the traveling direction of the media m.

The following equation is satisfied: d=(0.2~0.25)w, where d is a diameter of each sensing bearing 50 and w is a traveling width of the media m. Accordingly, when a sheet of the media m has completely passed between the sensing roller 44 and the sensing bearings 50, the sensing bearings 50 are rotated by approximately 1.5 revolutions. This means that the diameter d of the sensing bearings 50 has been relatively increased as compared to the related art.

The bearing holders 48 and 48' are designed such that their installation positions correspond to both ends of the traveling media m and the sensing bearings 50, installed on the bearing holders 48 and 48', can be brought into surface contact with the sensing roller 44.

Connecting brackets 52 are provided at both ends of the central shaft 46, respectively. An end of a restoring member 54 (e.g., a spring or elastic member) is connected to each of the connecting brackets 52. The other end of the restoring member 54 is hooked into a side of the frame. Since the restoring member 54 is installed as such, the central shaft 46 is rotated in a direction in which the sensing bearing 50 installed on the bearing holder 48 or 48' is brought into close surface contact with the sensing roller 44. That is, the restoring members 54 serve to bring the sensing bearings 50 into close surface contact with the sensing roller 44.

A fixed shaft 56 is installed on the flame such that both ends thereof are supported on the flame. Further, a damper member 58 is installed such that its one end is supported on the fixed shaft 56. The other end of the damper member 58 is connected to a connecting bracket 52' that is installed in the middle of the central shaft 46, i.e. between the bearing holders 48 and 48'. A coil spring is used for the damper member 58 which in turn serves to absorb vibration generated in the central shaft 46.

The coil spring used for the damper member 58 may be of a same type as that used for the restoring member 54. However, the damper member 58 should have a spring force less than that of a single restoring member 54. More specifically, the damper member 58 preferably has a spring force corresponding to about two thirds of the spring force of the single restoring member 54. That is, considering that a restoring member 54 is provided at both ends of the central shaft 46, the damper member 58 preferably has a spring force corresponding to about one third of the total spring force of the two opposite restoring members 54. The above spring force setting for the damper member 58 and the restoring members 54 has been determined through actual tests.

Finally, a thickness sensor 60 is provided for sensing the thickness of media m by measuring a rotating amount of the bearing holders 48 and 48'. An example of the thickness sensor 60 includes a RVDT (Rotational Variable Differential Transformer) sensor using a voltage change due to a rotational angle.

Hereinafter, the operation of the media thickness detector according to the present invention configured as above will be described in detail.

When the driving source is driven, the media m are fed. The thickness of the traveling media m is detected while they are passing between the sensing roller 44 and the sensing bearings 50. That is, when the driving force of the driving source is transmitted to the first gear shaft 32 through the driving belt 30, the first gear shaft 32 and thus the first gear 34 are rotated. The rotation of the first gear 34 causes the second gear 38 engaged with the first gear to be rotated, and the rotational shaft 40 is also rotated by means of the driven gear 42 engaged with the second gear 38. Here, the second gear 38 is used to set the rotational direction of the sensing roller 44 to be consistent with the traveling direction of the media m.

Accordingly, while the driving force of the driving source is transmitted through a train of gears 34, 38 and 42, the vibration that may be produced in the driving source and the driving belt 30 can be prevented from being transmitted to the sensing roller 44.

When the driving force is transmitted as such and the sensing roller 44 is rotated, the traveling media m passes between the sensing roller 44 and the sensing bearings 50. When the media m pass between the sensing roller 44 and the sensing bearings 50, which are in surface contact with each other, the bearing holders 48 and 48', with the sensing bearings 50 installed thereon, are rotated about the central shaft 46 by a predetermined angle against the elastic force of the restoring members 54.

Since the bearing holders 48 and 48' are rotated in proportion to the thickness of media m, the rotating amount of the bearing holders 48 and 48' is measured using the thickness sensor 60 and the thickness of media m can be detected.

Should vibration be produced in the central shaft 46, i.e. in the bearing holders 48 and 48' or the sensing bearings 50, the damper member 58 serves to absorb the vibration. Accordingly, the thickness of media m can be accurately measured in accordance with the rotating amount of the bearing holders 48 and 48'.

Since the damper member 58, having the spring force less than that of the restoring members 54, is connected in the middle of the central shaft 46, a substantial damping operation can be accomplished. However, if the spring forces of the damper member 58 and the restoring members 54 are the same as each other, the vibration may be further amplified due to a resonance phenomenon.

Furthermore, the diameter d of the sensing roller 50 was designed to be relatively larger as compared with the related art. Accordingly, since the sizes of the sensing bearings 50 are increased, the number of revolutions of the sensing bearings 50 made while a sheet of the media m passes between the sensing bearings 50 and the sensing roller 44 can be minimized.

In addition, the bearing holders 48 and 48' are separately manufactured and mounted to the central shaft 46. Therefore, it is easy to adjust the sensing bearings 50 installed on the bearing holders 48 and 48' so that they can be brought into surface contact with the sensing roller 44 at a desired pressure, respectively. For example, a user can loosen the attachment screws and move the bearing holders 48 and 48' to ensure that the bearings 50 contact the sensing roller 44 with equal pressure.

The media thickness detector of the present invention, configured as above, has the following advantages.

First, the vibration can be prevented from being transmitted to the sensing roller when the driving force of the driving source is transmitted to the sensing roller. Therefore, since the vibration is not transmitted to the sensing roller for feeding the media of which thickness will be measured, there is an advantage in that the thickness of media can be relatively accurately measured.

Further, the bearing holders on which the sensing bearings are installed are separately manufactured and mounted to the central shaft. Therefore, the installation of the bearing holders can be individually adjusted via screws 49, for example, such that the sensing bearings installed on the bearing holders can be more accurately brought into close contact with the sensing roller. Accordingly, there is another advantage in that the feeding of and thickness measurement for the media can be more accurately accomplished. Also, the bearing holders 48 and 48' can be adjusted to site at various points along a length of the central shaft 46. Therefore, the thickness of media m, having various widths (taken in a travel direction of the media m) can be measured, in accordance with the present invention.

Furthermore, since the damper member is installed at the central shaft on which the sensing bearings are installed, it can absorb the vibration of the central shaft. Therefore, any external disturbance is not transmitted to the sensing bearings, whereby the thickness of media can be more accurately measured.

The scope of the present invention is not limited by the illustrated embodiment but defined by the appended claims. It will be apparent that those skilled in the art can make various modifications and changes within the scope of the invention defined by the claims.

For example, by using a linkage or cam instead of the gear train, the vibration from the driving source can be prevented from being transmitted to the sensing roller. Although the coil spring has been used for the damper member, the damper member is not limited thereto. Any kinds of damper members may be employed if they can absorb the vibration from the driving source.

What is claimed is:

1. A media thickness detector, comprising:
   at least one sensing roller, against which a passing media bears;
   a central member spaced from said sensing roller;
   a first bearing holder attached to said central member;
   a first sensing bearing attached to said first bearing holder;
   a second bearing holder attached to said central member;
   a second sensing bearing attached to said second bearing holder;
   at least one elastic member tending to move said central member, such that said first and second sensing bearings are brought to bear against said at least one sensing roller; and
   a thickness sensor for detecting a thickness of the media passing between said first and second sensing bearings and said sensing roller based on a movement amount of said bearing holders,
   wherein the first and second bearing holders include an adjustment mechanism configured to first loosen the first and second bearing holders on the central member such that the first and second bearing holders can be freely rotated on the central member and moved to different positions on the central member and then to secure the first and second bearing holders at desired positions on the central member so that said first and second sensing bearings attached respectively to the first and second bearing holders can be brought to bear against said at least one sensing roller with a substantially equal force.

2. The media thickness detector as claimed in claim 1, wherein said at least one sensing roller is driven by a driving source to move media.

3. The media thickness detector as claimed in claim 2, wherein said at least one sensing roller is driven indirectly by said driving source through a geared transmission, which tends to remove any vibration generated by the driving source.

4. The media thickness detector as claimed in claim 1, wherein said first and second sensing bearings are freely rotatably attached to said first and second bearing holders, respectively.

5. The media thickness detector as claimed in claim 4, wherein said first and second sensing bearings are rollers, and
   wherein the following equation is satisfied:

$d=(0.2\sim0.25)w,$ where d is a diameter of the first and second sensing bearings, and w is a traveling width of the media.

6. The media thickness detector as claimed in claim 1, wherein said central member is a central shaft, and
   wherein said central shaft rotates under the force of said at least one elastic member to bring said first and second sensing bearings to bear on said sensing roller.

7. The media thickness detector as claimed in claim 6, wherein at least one of said first and second sensing bearings can be adjusted axially along said central shaft to accommodate media having a different dimension.

8. The media thickness detector as claimed in claim 6, wherein said adjustment mechanism of the first and second bearing holders comprises a set screw provided on each of said first and second bearing holders, which adjustably attaches said at least one of said first and second bearing holders to said central shaft.

9. The media thickness detector as claimed in claim 6, wherein said thickness sensor measures a degree of rotation of said central shaft to detect a thickness of a passing media.

10. The media thickness detector as claimed in claim 6, wherein said at least one elastic member includes a first spring connected to a first connecting bracket attached to said central shaft.

11. The media thickness detector as claimed in claim 10, wherein said at least one elastic member further includes a second spring connected to a second connecting bracket attached to said central shaft.

12. The media thickness detector as claimed in claim 6, further comprising:
    a damper connected to said central shaft for absorbing vibration generated in said central shaft.

13. The media thickness detector as claimed in claim 12, wherein said damper is connected to a position along said central shaft which is between said first and second bearing holders.

14. A media thickness detector, comprising:
    at least one sensing roller, against which a passing media bears;
    a central member spaced from said sensing roller;
    a first bearing holder attached to said central member;
    a first sensing bearing attached to said first bearing holder;
    at least one elastic member tending to move said central member, such that said first sensing bearing is brought to bear against said at least one sensing roller;
    a thickness sensor for detecting a thickness of the media passing between said first sensing bearing and said sensing roller based on a movement amount of said bearing holder; and
    a damper connected to at least one of said first bearing holder and said central member which tends to dampen any vibration present,
    wherein said damper is connected to said central member and is a separate element from said at least one elastic member,
    wherein said damper applies a force to said central member in a first direction, and wherein said at least one elastic member applies a force to said central member in a second direction, which is not parallel to said first direction.

15. The media thickness detector as claimed in claim 14, further comprising:
a second bearing holder attached to said central member; and
a second sensing bearing attached to said second bearing holder,
wherein said central member is a central shaft, and wherein said central shaft rotates under the force of said at least one elastic member to bring said first and second sensing bearings to bear on said sensing roller.

16. The media thickness detector as claimed in claim 15, wherein said at least one elastic member includes a first spring connected proximate a first end of said central shaft, and a second spring connected proximate a second end of said central shaft.

17. The media thickness detector as claimed in claim 16, wherein said damper includes a third spring connected to said central shaft.

18. The media thickness detector as claimed in claim 17, wherein said first and second springs act on said central shaft in first and second directions which are substantially parallel, and
wherein said third spring acts on said central shaft in a third direction which is not parallel to said first and second directions.

19. The media thickness detector as claimed in claim 18, wherein said third spring is connected to said central shaft at a location between said first and second bearing holders.

20. The media thickness detector as claimed in claim 18, wherein said third spring has a spring force less than a spring force of said first spring, and said third spring has a spring force less than a spring force of said second spring.

21. The media thickness detector as claimed in claim 20, wherein said third spring has a spring force which is approximately two thirds of the combined spring forces of said first and second springs.

22. A media thickness detector, comprising:
at least one sensing roller, against which a passing media bears;
a central member spaced from said sensing roller;
a first bearing holder attached to said central member;
a first sensing bearing attached to said first bearing holder;
a second bearing holder attached to said central member;
a second sensing bearing attached to said second bearing holder;
at least one elastic member tending to move said central member, such that said first and second sensing bearings are brought to bear against said at least one sensing roller;
a thickness sensor for detecting a thickness of the media passing between said first and second sensing bearings and said sensing roller based on a movement amount of said bearing holders, wherein, the first and second bearing holders include an adjustment mechanism configured to first loosen the first and second bearing holders on the central member such that the first and second bearing holders can be freely rotated on the central member and moved to different positions on the central member and then to secure the first and second bearing holders at desired positions on the central member so that said first and second sensing bearings attached respectively to the first and second bearing holders can be brought to bear against said at least one sensing roller with a substantially equal force; and
a damper connected to at least one of said first bearing holder, said second bearing holder and said central member which tends to dampen any vibration present.

* * * * *